(12) United States Patent
Johnson et al.

(10) Patent No.: US 10,711,871 B2
(45) Date of Patent: Jul. 14, 2020

(54) AXIALLY COMPACT LINEAR ACTUATOR DRIVE ARRANGEMENT

(71) Applicant: Schaeffler Technologies AG & Co. KG, Herzogenaurach (DE)

(72) Inventors: Joseph Johnson, Mooresville, NC (US); Craig Hooker, Indian Land, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 219 days.

(21) Appl. No.: 15/880,961

(22) Filed: Jan. 26, 2018

(65) Prior Publication Data

US 2019/0234498 A1      Aug. 1, 2019

(51) Int. Cl.
*F16H 25/20*      (2006.01)
*F16H 25/24*      (2006.01)

(52) U.S. Cl.
CPC .............. *F16H 25/20* (2013.01); *F16H 25/24* (2013.01); *F16H 2025/2053* (2013.01); *F16H 2025/2081* (2013.01)

(58) Field of Classification Search
CPC ......... F16H 25/2252; F16H 2025/2078; F16H 25/20; F16H 25/24; F16H 2025/2053; F16H 2025/2081; H02K 5/16; H02K 5/161; H02K 5/163; H02K 5/165; H02K 5/173; H02K 5/1732; H02K 5/1735; H02K 5/167; H02K 5/1672; H02K 5/1675; H02K 5/1677; H02K 5/1737; H02K 11/21; H02K 11/215; H02K 11/22

USPC ........................................................ 74/89.34
See application file for complete search history.

(56) References Cited

U.S. PATENT DOCUMENTS

| 4,579,012 | A | * | 4/1986 | Mabie | ..................... F16H 25/20 |
| | | | | | 74/89.34 |
| 5,099,161 | A | | 3/1992 | Wolfbauer, III | |
| 6,794,779 | B2 | | 9/2004 | Ma et al. | |
| 8,286,520 | B2 | | 10/2012 | Liegeois et al. | |
| 8,794,085 | B2 | | 8/2014 | Balducci et al. | |
| 9,041,259 | B2 | * | 5/2015 | Palfenier | .................. H02K 5/20 |
| | | | | | 310/43 |
| 9,051,974 | B2 | * | 6/2015 | Gramann | .............. F16D 29/005 |

(Continued)

FOREIGN PATENT DOCUMENTS

DE     102011075950 A1 *  11/2012   ......... F16H 25/2252

*Primary Examiner* — Jake Cook
*Assistant Examiner* — Gregory Robert Weber
(74) *Attorney, Agent, or Firm* — Volpe and Koenig, P.C.

(57) ABSTRACT

An linear actuator drive arrangement is disclosed that includes a drive screw including a drive screw threading on an outer periphery thereof and a first axial end of the drive screw is configured to support a load. The arrangement includes a motor including a stator and a rotor arranged radially within the stator. The rotor includes a rotor housing, a first ring nut, and a second ring nut. A plurality of planetary screws are arranged radially between the drive screw and the first ring nut and the second ring nut. A bearing assembly is arranged radially inside a first axial end of the rotor housing, and the bearing assembly axially supports the rotor housing. An encoder ring is fixed to a radially outer surface of the rotor housing at the first axial end of the rotor housing, and the encoder ring is concentric with the bearing assembly.

15 Claims, 1 Drawing Sheet

(56) References Cited

U.S. PATENT DOCUMENTS

| | | | |
|---|---|---|---|
| 2015/0015104 A1* | 1/2015 | Kataoka | H02K 7/06 |
| | | | 310/80 |
| 2016/0069449 A1* | 3/2016 | Kanai | F16H 57/08 |
| | | | 475/158 |
| 2016/0230814 A1* | 8/2016 | Schumann | F16D 13/08 |
| 2016/0348775 A1* | 12/2016 | Schumann | F16H 25/2252 |
| 2017/0089436 A1* | 3/2017 | Eyraud | H02K 7/083 |
| 2019/0011026 A1* | 1/2019 | Tesar | F16H 25/2252 |

* cited by examiner

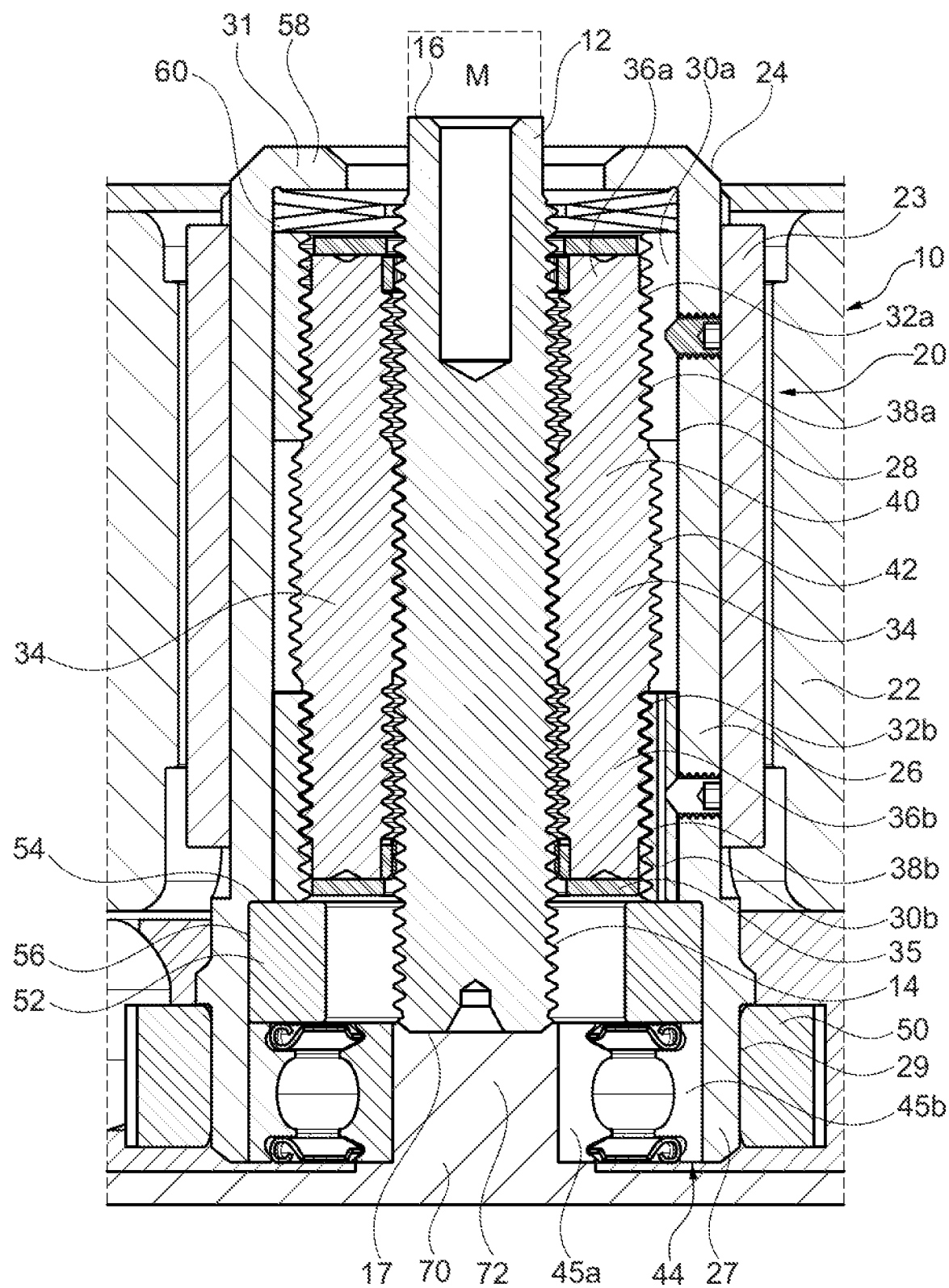

US 10,711,871 B2

AXIALLY COMPACT LINEAR ACTUATOR DRIVE ARRANGEMENT

FIELD OF INVENTION

This invention is generally related to a linear actuator drive mechanism.

BACKGROUND

Linear actuators are well known and include a variety of configurations. An important requirement in many applications is that the actuator is compact in the axial direction (i.e. total length versus stroke). In order to achieve this, a compact drive mechanism with high force capacity is needed. Some existing drive systems include telescopic features, such as disclosed in U.S. Pat. Nos. 8,286,520 and 8,794,085. Other known types of linear actuators attempt to provide a compact arrangement, but require complex drive mechanisms, such as disclosed in U.S. Pat. No. 6,794,779. Another type of linear actuator requires a gearbox, such as disclosed in U.S. Pat. No. 4,579,012. However, this type of arrangement increases the overall axial length of the assembly, reduces efficiency, and introduces additional failure modes. An additional type of linear actuator is disclosed in U.S. Pat. No. 5,099,161. This type of linear actuator is incapable of handling high loads due to a relatively low mechanical advantage of its ball screw assembly.

It would be desirable to provide a compact and efficient linear actuator drive arrangement that is capable of supporting a high load and is also durable.

SUMMARY

A linear actuator drive arrangement is disclosed that is relatively compact, has a relatively high mechanical advantage, and does not require a complex gearbox. The linear actuator drive arrangement includes a drive screw including a drive screw threading on an outer periphery thereof and a first axial end of the drive screw is configured to support a load. The arrangement includes a motor including a stator and a rotor arranged radially within the stator. The rotor includes a rotor housing, a first ring nut, and a second ring nut. The first and second ring nuts are each fixed to a radially inner surface of the rotor housing and include ring nut grooves on an inner periphery thereof. A plurality of planetary screws are arranged radially between the drive screw and the first ring nut and the second ring nut. Each planetary screw of the plurality of planetary screws includes: (1) axial ends having planetary screw grooves configured to engage the ring nut grooves of the first ring nut and the second ring nut, and (2) a medial portion including a planetary screw threading configured to engage the drive screw threading to axially drive the drive screw. A bearing assembly is arranged radially inside a first axial end of the rotor housing, and the bearing assembly axially supports the rotor housing. An encoder ring is fixed to a radially outer surface of the rotor housing at the first axial end of the rotor housing, and the encoder ring is concentric with the bearing assembly.

Preferred arrangements with one or more features of the invention are described below and in the claims.

BRIEF DESCRIPTION OF THE DRAWING

The foregoing summary as well as the following detailed description will be best understood when read in conjunction with the appended drawing. In the drawing:

FIG. 1 is a side view in cross section of a linear actuator drive arrangement according to an embodiment.

DETAILED DESCRIPTION OF THE PREFERRED EMBODIMENTS

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivates thereof, and words of similar import.

As shown in FIG. 1, a linear actuator drive arrangement 10 is illustrated. The linear actuator drive arrangement 10 includes a drive screw 12 including a drive screw threading 14 on an outer periphery thereof. A first axial end 16 of the drive screw 12 is configured to support a load (M). One of ordinary skill in the art recognizes that the load (M) can represent any type or size of load.

A motor 20 is provided that includes a stator 22 and a rotor 24 arranged radially within the stator 22. The rotor 24 includes a rotor housing 26, a first ring nut 30a, and a second ring nut 30b. Magnets 23 of the motor 20 are directly attached to an outer surface of the rotor housing 26. The stator 22 is axially smaller than the rotor housing 26, which allows for a more axially compact arrangement.

The first and second ring nuts 30a, 30b are each fixed to a radially inner surface 28 of the rotor housing 26 and each include ring nut grooves 32a, 32b on an inner periphery thereof. A plurality of planetary screws 34 are arranged radially between the drive screw 12 and the first ring nut 30a and the second ring nut 30b. Each planetary screw of the plurality of planetary screws 34 includes: (1) axial ends 36a, 36b having planetary screw grooves 38a, 38b configured to engage the ring nut grooves 32a, 32b of the first ring nut 30a and the second ring nut 30b, and (2) a medial portion 40 including a planetary screw threading 42 configured to engage the drive screw threading 14 to axially drive the drive screw 12. In one embodiment, the plurality of planetary screws 34 are supported by a cage 35. One of ordinary skill in the art would recognize from the present disclosure that the cage 35 can be omitted.

A bearing assembly 44 is arranged radially inside a first axial end 27 of the rotor housing 26, and the bearing assembly 44 axially supports the rotor housing 26. In one embodiment, the bearing assembly 44 is an angular contact bearing. In one embodiment, the bearing assembly 44 is a four-point contact bearing, which allows for a higher axial load capacity than a standard bearing.

An encoder ring 50 is fixed to a radially outer surface 29 of the rotor housing 26 at the first axial end 27 of the rotor housing 26, and the encoder ring 50 is concentric with the bearing assembly 44. The encoder ring 50 and the bearing assembly 44 are co-planar within a radially extending plane. An encoder detector (which is not illustrated) is arranged near the encoder ring 50 for detecting a position of the encoder ring 50. The rotor housing 26 directly contacts both the encoder ring 50 and an outer ring 45b of the bearing assembly 44.

In one embodiment, a support ring 52 is arranged axially between a support shoulder 54 defined on a radially inner surface 56 of the rotor housing 26 and the bearing assembly 44. One of ordinary skill in the art would recognize that the arrangement can be modified can omit the support ring 52.

In one embodiment, a second axial end 31 of the rotor housing 26 includes a radially inwardly extending flange 58. This radially inwardly extending flange 58 serves as a stop for a biasing element 60. The biasing element 60 is arranged between the radially inwardly extending flange 58 of the rotor housing 26 and the first ring nut 30a and provides a preload for the first ring nut 30a.

A linear actuator housing 70 surrounds the motor 20 and includes a support post 72 against which a second axial end 17 of the drive screw 12 abuts in a retracted position. A radially inner ring 45a of the bearing assembly 44 is mounted on the support post 72.

Having thus described various embodiments of the present linear actuator drive arrangement in detail, it is to be appreciated and will be apparent to those skilled in the art that many changes, only a few of which are exemplified in the detailed description above, could be made in the linear actuator drive arrangement without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LOG TO REFERENCE NUMBERS linear actuator drive arrangement 10
drive screw 12
drive screw threading 14
first axial end 16
second axial end 17
motor 20
stator 22
magnets 23
rotor 24
rotor housing 26
first axial end 27
radially inner surface 28
radially outer surface 29
first ring nut 30a
second ring nut 30b
second axial end 31
ring nut grooves 32a, 32b
plurality of planetary screws 34
cage 35
axial ends 36a, 36b
planetary screw grooves 38a, 38b
medial portion 40
planetary screw threading 42
bearing assembly 44
radially inner ring 45a
radially outer ring 45b
encoder ring 50
support ring 52
support shoulder 54
radially inner surface 56
radially inwardly extending flange 58
biasing element 60
linear actuator housing 70
support post 72

What is claimed is:

1. A linear actuator drive arrangement comprising:
a drive screw including a drive screw threading on an outer periphery thereof, a first axial end of the drive screw being configured to support a load;
a motor including a stator and a rotor arranged radially within the stator, the rotor including:
a rotor housing;
a first ring nut and a second ring nut, the first and second ring nuts are each fixed to a radially inner surface of the rotor housing and include ring nut grooves on an inner periphery thereof;
a plurality of planetary screws arranged radially between the drive screw and the first ring nut and the second ring nut,
each planetary screw of the plurality of planetary screws includes: (1) axial ends having planetary screw grooves configured to engage the ring nut grooves of the first ring nut and the second ring nut, and (2) a medial portion including a planetary screw threading configured to engage the drive screw threading to axially drive the drive screw;
a bearing assembly arranged radially inside a first axial end of the rotor housing, the bearing assembly axially supporting the rotor housing; and
an encoder ring fixed to a radially outer surface of the rotor housing at the first axial end of the rotor housing, the encoder ring is concentric with the bearing assembly, and the encoder ring radially surrounds the bearing assembly.

2. The linear actuator drive arrangement of claim 1, wherein the bearing assembly is an angular contact bearing.

3. The linear actuator drive arrangement of claim 1, wherein a support ring is arranged axially between a support shoulder defined on a radially inner surface of the rotor housing and the bearing assembly.

4. The linear actuator drive arrangement of claim 1, wherein a second axial end of the rotor housing includes a radially inwardly extending flange.

5. The linear actuator drive arrangement of claim 4, wherein a biasing element is arranged between the radially inwardly extending flange of the rotor housing and the first ring nut.

6. The linear actuator drive arrangement of claim 1, wherein the plurality of planetary screws are supported by a cage.

7. The linear actuator drive arrangement of claim 1, wherein stator is axially smaller than the rotor housing.

8. The linear actuator drive arrangement of claim 1, wherein the rotor housing directly contacts both the encoder ring and a radially outer ring of the bearing assembly.

9. A linear actuator drive arrangement comprising:
a drive screw including a drive screw threading on an outer periphery thereof, a first axial end of the drive screw being configured to support a load;
a motor including a stator and a rotor arranged radially within the stator, the rotor including:
a rotor housing;
a first ring nut and a second ring nut, the first and second ring nuts are each fixed to a radially inner surface of the rotor housing and include ring nut grooves on an inner periphery thereof;
a plurality of planetary screws arranged radially between the drive screw and the first ring nut and the second ring nut,
each planetary screw of the plurality of planetary screws includes: (1) axial ends having planetary screw grooves configured to engage the ring nut grooves of the first ring nut and the second ring nut, and (2) a medial portion including a planetary screw threading configured to engage the drive screw threading to axially drive the drive screw;

a bearing assembly arranged radially inside a first axial end of the rotor housing, the bearing assembly axially supporting the rotor housing; and an encoder ring fixed to a radially outer surface of the rotor housing at the first axial end of the rotor housing, and the encoder ring is concentric with the bearing assembly; and a linear actuator housing including a support post against which a second axial end of the drive screw abuts in a retracted position, and a radially inner ring of the bearing assembly is mounted on the support post.

10. A linear actuator drive arrangement comprising:

a drive screw including a drive screw threading on an outer periphery thereof, a first axial end of the drive screw being configured to support a load;

a motor including a stator and a rotor arranged radially within the stator, the rotor including:

a rotor housing;

a first ring nut and a second ring nut, the first and second ring nuts are each fixed to a radially inner surface of the rotor housing and include ring nut grooves on an inner periphery thereof;

a plurality of planetary screws arranged radially between the drive screw and the first ring nut and the second ring nut, each planetary screw of the plurality of planetary screws includes: (1) axial ends having a planetary screw grooves configured to engage the ring nut grooves of the first ring nut and the second ring nut, and (2) a medial portion including a planetary screw threading configured to engage the drive screw threading to axially drive the drive screw;

an angular contact bearing assembly arranged radially inside a first axial end of the rotor housing and a radially outer ring of the angular contact bearing assembly is in direct contact with a radially inner surface of the rotor housing, the angular contact bearing assembly axially supporting the rotor housing; and an encoder ring fixed directly to a radially outer surface of the rotor housing at the first axial end of the rotor housing, the encoder ring is concentric with the angular contact bearing assembly, and the encoder ring radially surrounds the angular contact bearing assembly.

11. The linear actuator drive arrangement of claim 10, wherein a support ring is arranged axially between a support shoulder defined on a radially inner surface of the rotor housing and the bearing assembly.

12. The linear actuator drive arrangement of claim 10, wherein a second axial end of the rotor housing includes a radially inwardly extending flange.

13. The linear actuator drive arrangement of claim 12, wherein a biasing element is arranged between the radially inwardly extending flange of the rotor housing and the first ring nut.

14. The linear actuator drive arrangement of claim 10, further comprising a linear actuator housing, the linear actuator housing including a support post against which a second axial end of the drive screw abuts in a retracted position, and a radially inner ring of the bearing assembly is mounted on the support post.

15. The linear actuator drive arrangement of claim 10, wherein the plurality of planetary screws are supported by a cage.

* * * * *